(Model.)

H. L. KINGSLEY.
King Bolt.

No. 242,332.  Patented May 31, 1881.

WITNESSES:
A. Schehl.
C. Sedgwick

INVENTOR:
H. L. Kingsley
BY Munn & Co
ATTORNEYS.

UNITED STATES PATENT OFFICE.

HORACE L. KINGSLEY, OF RACINE, WISCONSIN.

KING-BOLT.

SPECIFICATION forming part of Letters Patent No. 242,332, dated May 31, 1881.

Application filed April 13, 1881. (Model.)

*To all whom it may concern:*

Be it known that I, HORACE L. KINGSLEY, of Racine, in the county of Racine and State of Wisconsin, have invented a new and useful Improvement in King-Bolt Fixtures for Vehicles, of which the following is a specification.

Figure 1:
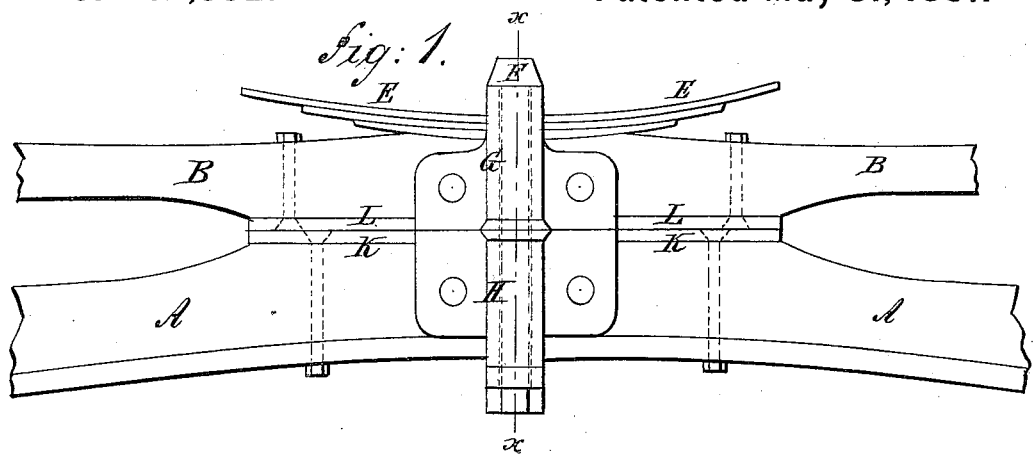
Figure 2:
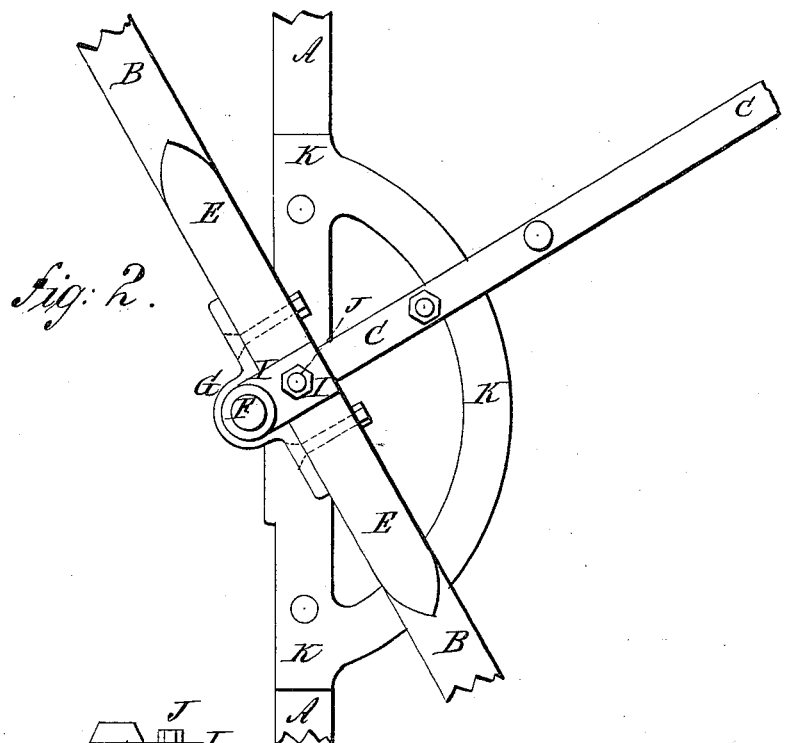
Figure 3:
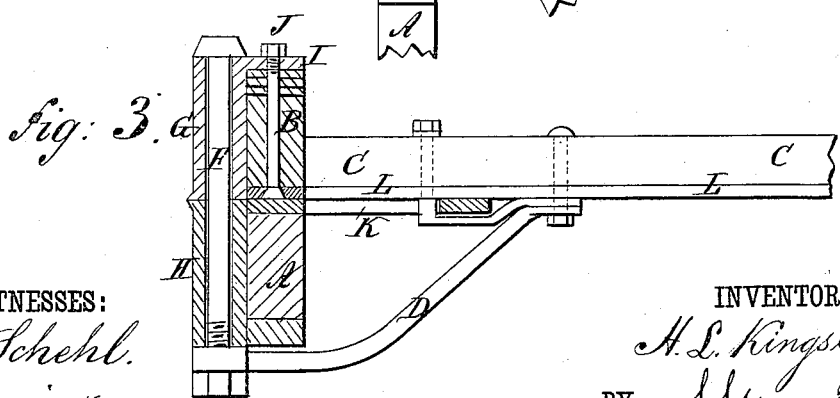

Figure 1 is a front elevation of my improvement. Fig. 2 is a plan view of the same, showing the axle turned upon the king-bolt. Fig. 3 is a sectional side elevation of the same, taken through the line $x\ x$, Fig. 1.

Similar letters of reference indicate corresponding parts.

The object of this invention is to increase the strength and durability of king-bolt connections and lessen the cost of constructing the said connections.

The invention consists in constructing king-bolt fixtures of the upper flanged socket bolted to the forward side of the head-block, and having an arm formed upon its upper end to overlap the lower part of the spring and receive the spring fastening-bolt, and the lower flanged socket made in one piece with the fifth-wheel and bolted to the forward side of the axle, whereby the king-bolt will be connected with the vehicle securely and without weakening the head-block and axle, as will be hereinafter fully described.

In the accompanying drawings, A represents the forward axle, B the head-block, C the reach, D the brace, and E the forward spring, of a vehicle.

F is the king-bolt, which passes down through the sockets G H. The socket G has flanges or lugs upon its sides, which are bolted or otherwise secured to the forward side of the head-block B. The upper end of the socket G projects above the top of the head-block B and the lower part of the spring E, and has a rearwardly-projecting arm, I, formed upon it, which rests upon the upper side of the said lower part of the spring E, and is connected with the said spring by the bolt J.

The lower socket, H, has lugs or flanges formed upon its sides, which are bolted or otherwise secured to the forward side of the axle A. The upper ends of the socket H and its flanges are formed in one piece with the fifth-wheel K, which is attached to the upper side of the axle A. The lower end of the socket H projects to or a little below the level of the lower side of the axle A, to receive the forward end of the brace D, that receives and holds the lower end of the king-bolt F, so that the said brace will be clear of the said axle A.

To the lower sides of the head-block B and reach C is bolted the three-armed wear-iron L, that rests upon the fifth-wheel K.

With this construction the head-block B and axle A are not weakened by having a hole formed through them to receive the king-bolt, the wear of the various parts is lessened, and the fixtures can be made and applied to the vehicle at less cost than when the ordinary construction is used.

Having thus fully described my invention, I claim as new and desire to secure by Letters Patent—

1. King-bolt fixtures, constructed substantially as herein shown and described, consisting of the upper flanged socket, G, having arm I, and the lower flanged socket, H, made in one piece with the fifth-wheel K, as set forth.

2. The combination, with the axle A, the head-block B, the reach C, the brace D, the spring E, and the king-bolt F, of the flanged socket G, having arm I to overlap the said spring E, and the flanged socket H, having the fifth-wheel K, formed in one piece with it, substantially as herein shown and described, whereby the king-bolt is securely connected with the vehicle, as set forth.

3. In king-bolt fixtures, the flanged socket G, made with an arm, I, substantially as herein shown and described, to overlap the lower part of the spring and receive the spring fastening-bolt, as set forth.

HORACE L. KINGSLEY.

Witnesses:
N. M. WALLIS,
E. W. MARCHER.